US008305968B2

(12) United States Patent
Savolainen

(10) Patent No.: US 8,305,968 B2
(45) Date of Patent: Nov. 6, 2012

(54) SOLICITATION TRIGGERS FOR OPENING A NETWORK LINK

(75) Inventor: Teemu Savolainen, Pirkkala (FI)

(73) Assignee: Nokia Corporation, Espoo (FI)

( * ) Notice: Subject to any disclaimer, the term of this patent is extended or adjusted under 35 U.S.C. 154(b) by 757 days.

(21) Appl. No.: 11/037,198

(22) Filed: Jan. 19, 2005

(65) Prior Publication Data

US 2006/0114822 A1  Jun. 1, 2006

(30) Foreign Application Priority Data

Dec. 1, 2004  (FI) ...................................... 20041556

(51) Int. Cl.
*H04W 4/00* (2009.01)
(52) U.S. Cl. ......................... 370/329; 370/420; 370/463
(58) Field of Classification Search .................. 370/229, 370/329, 227, 228, 475, 465; 709/227, 228, 709/229
See application file for complete search history.

(56) References Cited

U.S. PATENT DOCUMENTS

| 7,058,017 | B2 * | 6/2006 | Lee et al. ........................ 370/238 |
| 7,206,294 | B2 * | 4/2007 | Garahi et al. ................... 370/315 |
| 7,239,620 | B2 * | 7/2007 | Storm ............................. 370/331 |
| 2002/0071416 | A1 * | 6/2002 | Carlson et al. ................. 370/338 |
| 2003/0185236 | A1 | 10/2003 | Asano et al. |
| 2004/0158639 | A1 * | 8/2004 | Takusagawa et al. .......... 709/229 |
| 2005/0099976 | A1 * | 5/2005 | Yamamoto et al. ............ 370/331 |
| 2005/0117590 | A1 * | 6/2005 | Ronneke ................... 370/395.52 |

FOREIGN PATENT DOCUMENTS

| WO | WO-2004/006539 A1 | 1/2004 |
| WO | WO 2004/006539 A1 | 1/2004 |

OTHER PUBLICATIONS

Thomson et al, RFC 2462, Stateless Address Autoconfiguration, Dec. 1998.*
S. Thomson et al. "IPv6 Stateless Address Autoconfiguration" IBM, Dec. 1998; 23 pages.
3GPP TS 23.002 V6.5.0 (Jun. 2004), Technical Specification, 3$^{rd}$Generation Partnership Project; Technical Specification Group Services and Systems Aspects; Network Architecture (Release 6), (57 pages).

* cited by examiner

*Primary Examiner* — Kevin C Harper
*Assistant Examiner* — Henry Baron
(74) *Attorney, Agent, or Firm* — Harrington & Smith

(57) ABSTRACT

A method and a system opens a network connection using solicitation triggers. A terminal device that is connecting to a communication network sends a network connection request to a mobile network communication device and forms a connection between the terminal device and the mobile network communication device. The terminal device sends a network initialization signal in order to connect to the desired network. The mobile network communication device uses a pre-configured network connection for forwarding the network initialization signal to the desired network. The desired network will respond by returning necessary network information that is forwarded to the terminal device.

37 Claims, 3 Drawing Sheets

SOLICITATION TRIGGERS FOR OPENING A NETWORK LINK

FIELD OF THE INVENTION

The invention relates to data communication. The invention relates especially to opening and terminating a network link on demand.

BACKGROUND OF THE INVENTION

Modern network connectivity includes a plurality of transmission schemes. There are several transmission protocols that can be transferred on different transmission mediums. Portable devices, such as a laptop PC, are typically connected to the Internet by using IPv4 protocol. The most efficient way is to connect by using a regular Ethernet connection or Wireless Local Area Network. However, these technologies are not always available. Thus, there is a need for a connection arranged over a mobile telecommunication network.

Typically the connection over a mobile telecommunication network is implemented as a dial up connection. This is supported by modern operating systems. The dial up connection dials to the number of the selected internet service provider and uses the connection for data transfer needs. Typically the dial up connection obtains a dynamic IP-address that is assigned to the terminal device using the dial up connection.

In the case of IPv6 protocol, in the establishment of a connection to a router a neighbor discovery protocol for IPv6 is used. Further details of the protocol are disclosed in RFC 1970 (Request for Comments) dated on August 1996 published by Internet Engineering Task Force. Automatic IPv6 Stateless Address Autoconfiguration is disclosed in RFC 1971 dated on August 1996 published by Internet Engineering Task Force. These documents have been revised and replaced by RFC 2461 and RFC 2462, dated on December 1998.

Drawbacks of the prior art is that the dial up connection needs to be implemented to support different connection protocols. For example, it is possible that the operating system supports IPv4 and IPv6 protocols but only IPv4 is available for dial up connections. This is a major drawback as there are several benefits in using IPv6 protocol. Typically this problem has been solved by tunneling a protocol over an other protocol. However, this solution is not as efficient as native support without tunneling.

Thus, there is a need for a solution allowing for opening and terminating a network link that allows using different transmission mediums with the desired transmission protocol.

SUMMARY OF THE INVENTION

The invention discloses a method and a system for opening a network connection using solicitation triggers. According to the invention a terminal device that is connecting to a network sends a network connection request to a network connectivity device and establishes a connection between the terminal device and the network connectivity device. Typically the network communication device is a separate mobile device or an internal mobile device or component with network connectivity capabilities. Then the terminal device sends a network initialization signal in order to connect to the desired network. The network connectivity device uses a pre-configured network connection for forwarding the network initialization signal to the desired network. The desired network will respond by returning necessary network information that is forwarded to the terminal device.

According to the invention a following method is used. As a first step a connection between the terminal device and the network connectivity device is opened. This could be for example a cable connection, a bluetooth connection or other connection that is known to a person skilled in the art. The second step comprises configuring the network connection by sending a network initialization signal from the terminal device to the network connectivity device. After receiving the network initialization signal, the network connectivity device opens a pre-configured network connection to the network. The network initialization signal will be then sent from the network connectivity device to the network using the pre-configured connection. The network connectivity information will be received as a response from the network to the network connectivity device. The network connectivity information is forwarded to the terminal device.

In an embodiment the invention is implemented as software that is executed in the network connectivity device. The network connectivity device is configured to listen the terminal device for possible connection requests. When a connection request is received, the software will start an opening procedure that comprises receiving the actual network initialization signal. The network connectivity device then forwards the network initialization signal by using a pre-configured network connection and waits for response that is forwarded to the terminal device. In a further embodiment the connection is terminated after a predetermined time of inactivity. The activity may be requested before terminating the connection.

In an embodiment of the invention several terminal devices are connected to one network connectivity device. In the case of inactivity the connection will be terminated if all connected terminal devices are detected inactive.

The benefit of the invention is that it allows different types of terminal devices to use different types of networks easily. The terminal device may use any network connection solicitation that it is capable of using, and the network connectivity device may be configured to establish and route the connection. It is simpler to implement this kind of functionality to the network connectivity device than to a terminal device that would require changes in network connectivity layers and in even in standards. A further benefit of the invention is that the user does not need to make any configurations to the terminal device but he/she can request the needed configuration information from the network.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE INVENTION

Reference will now be made in detail to the embodiments of the present invention, examples of which are illustrated in the accompanying drawings.

Figure 1:
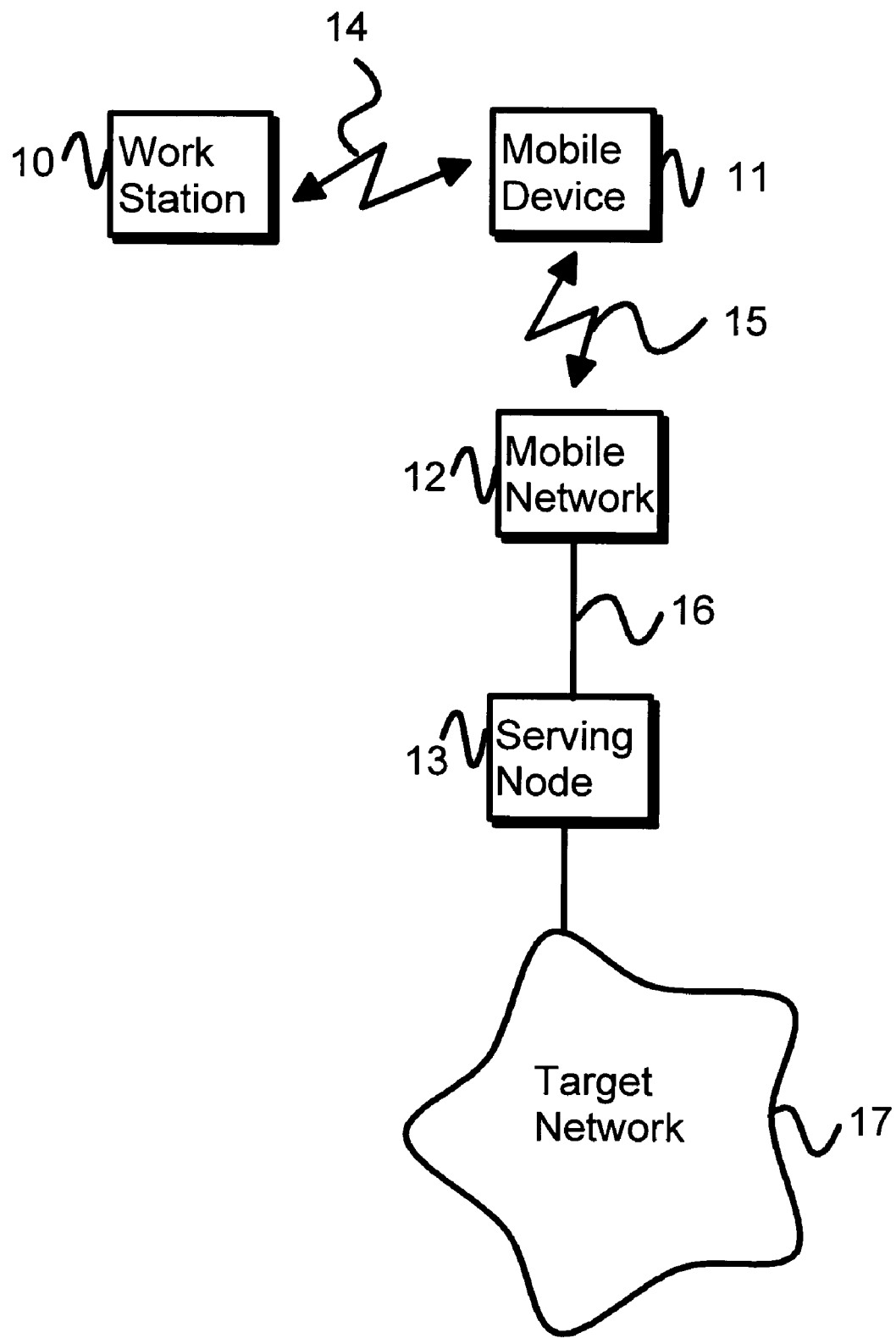
FIG. 1 is a block diagram of an example embodiment of the present invention.

In FIG. 1 a block diagram of an example embodiment of the present invention is disclosed. The example embodiment comprises a workstation 10, a mobile device 11, a mobile network 12, a serving node 13 and a target network 17. The workstation is connected to the mobile device by available connectivity means 14. These can be for example a wireless connection or a wired connection. Typically the workstation is a portable computer and the mobile device is a data communications enabled mobile telephone, but it is obvious to a person skilled in the art that also different types of terminals may be used. Typically the connectivity means 14 are enabled only when needed as there might be expenses for keeping the connection opened, or there might be bandwidth limitations that require terminating the connection for allowing others to have the best possible quality of service. The mobile device 11 is arranged to function as a network connectivity device.

The mobile device 11 is connected to the mobile network 12 by the connection 15. The type of the connection depends on the type of the mobile device. Typically the connection 15 is a pre-configured network connection. Thus, there is no need to choose connectivity parameters. However, the invention does not limit the type of the connection. Thus, it is possible to use for example a packet switched wireless local area network or a circuit switched data call. In case there is no pre-configured connection available, the user may choose the connection type. The mobile device includes means for receiving, transmitting and forwarding data communication. Thus, the mobile device is able to receive connection requests and network initialization signals and able to act accordingly to fulfill the requests.

The further connection 16 that is arranged to connect the mobile network to the target network 17 can be any available network known to a person skilled in the art. In the example of FIG. 1 there is the separate serving node 13, which is the case for example in the GPRS (General Packet Radio System).

Figure 2:
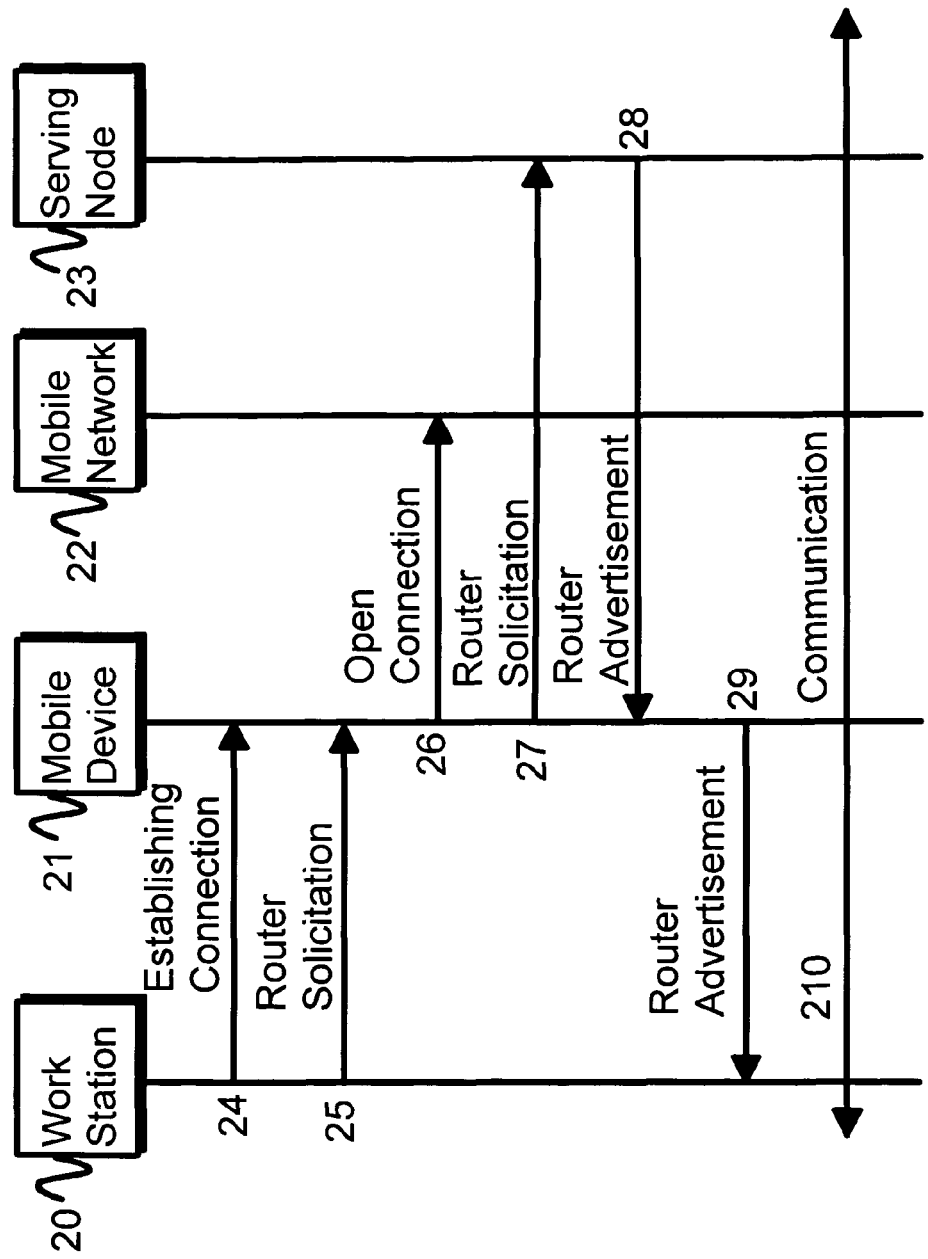
FIG. 2 is a signaling chart of an example implementation presented in FIG. 1.

FIG. 2 discloses a signaling chart of an example implementation presented in FIG. 1, wherein a workstation 20, a mobile device 21, a mobile network 22 and a serving node 23 correspond to those of FIG. 1. In FIG. 2 the network initialization signal is an IPv6 router solicitation According to the example the workstation 20 is initializing a network connection. The workstation 20 connects to the network via the mobile device 21, signal 24. After establishing the connection between the workstation and the mobile device, a router solicitation message is sent, signal 25. This signal is typically an IPv6 router solicitation. When the mobile device receives the router solicitation, it establishes a pre-configured connection to the mobile network, signal 26. Using the pre-configured connection, the mobile device forwards the router solicitation to the serving node, signal 27.

The serving node establishes the connection and informs the mobile node with a router advertisement, signal 28. The router advertisement is forwarded to the workstation, signal 29. After receiving the advertisement, the workstation is connected to the network and may start the communication with other devices, signal 210. If the signal 29 is not received, the mobile device may use a local address, such as IPv6 link-local address.

In another embodiment the network connection is already opened by the mobile device. For example, if two workstations desire to share the connection or the connection is always open, the connection from the mobile device to the mobile network needs not to be established twice. The end user does not notice any difference if the connection has been already opened. It is possible to arrange a network address translation service to the mobile device. The network address translation is typically used when communicating with target network instead of one link. Thus, the mobile device is able to serve several workstations that have their own addresses even if the used protocol would not support it. However, if the user does no want to use network address translation, further signaling is required for obtaining a proper network address and connection.

Figure 3:
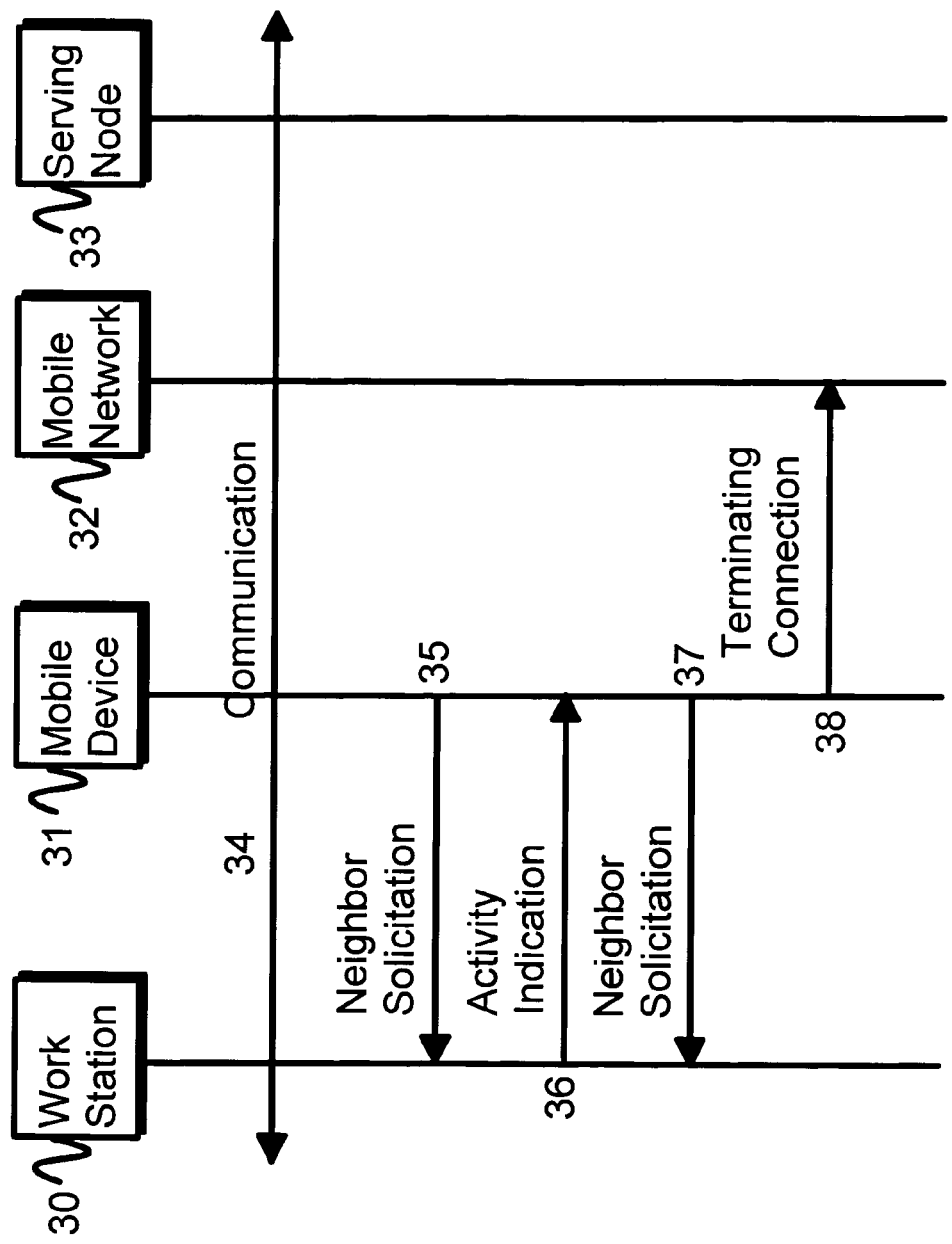
FIG. 3 is a signaling chart of an example implementation presented in FIG. 1.

FIG. 3 discloses a signaling chart of an example implementation presented in FIG. 1, wherein a workstation 30, a mobile device 31, a mobile network 32 and a serving node 33 correspond to those of FIG. 1. The signaling chart of FIG. 3 discloses terminating the connection that was opened in the signaling chart of FIG. 2. If the communication represented by signal 34 is not active during pre-determined timeout, the mobile device sends a neighbor solicitation, signal 35. In the example of FIG. 3 the workstation first responds to the solicitation by sending an activity indication, signal 36. After a second timeout the mobile device sends again the neighbor solicitation, signal 37. The workstation does not respond to the solicitation and the mobile device terminates the network connection, signal 38.

In another embodiment of the invention the mobile device is arranged to send an inactivity indication to indicate that it does not need the network connection anymore. If the mobile device serves a plurality of workstations, the connection is terminated when there are no active workstations left.

In another embodiment, the invention is implemented as a computer program that is executed in the mobile device. In accordance with FIG. 2 and the embodiment, the mobile device 21 is configured to expect a connection establishment request 24 and a router solicitation 25 from the workstation 20. In the embodiment the mobile device 21 opens a pre-configured network connection 26 and forwards the router solicitation 27. After forwarding the router solicitation 27 the mobile device 21 is arranged to expect a router advertisement 28 that is forwarded back to the workstation 20. When the workstation 20 has received the router advertisement 29, the network connection has been set up. In accordance with FIG. 3 and the embodiment, the mobile device 31 is arranged to check the activity of the workstation 30 if the communication represented by signal 34 is active during a pre-determined timeout. If the workstation 30 is still active, the connection is maintained. Otherwise the communication is terminated. In case there are several workstations connected to the mobile device 31, the mobile device 31 terminates the connection when there are no active workstations left.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:
1. A method, comprising:
opening a local connection between a terminal and a wireless mobile network connectivity device;
starting a network link configuration by receiving a network initialization signal from the terminal at the wireless mobile network connectivity device, the network initialization signal comprising an internet protocol version 6 router solicitation;
responsive to receiving the network initialization signal, opening a pre configured internet protocol network connection to a network with the wireless mobile network connectivity device, the pre configured internet protocol network connection comprising a wireless connection between the wireless mobile network connectivity device and an element of the network;

sending the network initialization signal from the wireless mobile network connectivity device to the network;

receiving network connectivity information from the network at the wireless mobile network connectivity device; and forwarding the network connectivity information from the wireless mobile network connectivity device to the terminal.

2. The method according to claim 1, wherein opening a pre configured internet protocol network connection further comprises opening a pre configured internet protocol version 6 connection.

3. The method according to claim 1, wherein opening a pre configured internet protocol network connection further comprises:

opening a pre configured internet protocol version 4 connection.

4. The method according to claim 1, wherein the network connectivity information comprises an internet protocol version 6 router advertisement.

5. The method according to claim 1, wherein the network connectivity information comprises an internet protocol version 6 address.

6. The method according to claim 1, further comprising: terminating a network link corresponding to the terminal after a pre determined inactivity timeout.

7. A non-transitory computer-readable medium with an executable computer program stored thereon, said computer program instructs a processor to perform the following:

receiving a request to open a local connection from a terminal at a wireless mobile network connectivity device and causing the local connection to be opened;

receiving a network initialization signal from the terminal at the wireless mobile network connectivity device, the network initialization signal comprising an internet protocol version 6 router solicitation;

responsive to receiving the network initialization signal, opening a pre configured network connectivity device, the pre configured internet protocol network connection comprising a wireless connection between the wireless mobile network connectivity device and a portion of the network;

sending the network initialization signal from the wireless mobile network connectivity device to the network;

receiving network connectivity information from the network at the wireless mobile network connectivity device; and forwarding the network connectivity information from the wireless mobile network connectivity device to the terminal.

8. The computer-readable medium according to claim 7, wherein the computer program is further configured, when opening a pre configured internet protocol network connection, to control the processor to perform opening a pre configured internet protocol version 6 connection.

9. The computer-readable medium according to claim 7, wherein the computer program is further configured, when opening a pre configured internet protocol network connection, to control the processor to perform opening a pre configured internet protocol version 4 connection.

10. The computer-readable medium according to claim 7, wherein the network connectivity information comprises an internet protocol version 6 advertisement.

11. The computer-readable medium according to claim 7, wherein the network connectivity information comprises an internet protocol version 6 address.

12. The computer-readable medium according to claim 7, wherein the computer program is further configured to control the processor to perform terminating a network link corresponding to the terminal after a pre determined inactivity timeout.

13. A system, comprising:

a target network;

a mobile network, wherein said mobile network is connected to said target network;

a wireless mobile network connectivity device, wherein said mobile network connectivity device is connectable via a wireless connection to said mobile network;

a terminal, wherein said terminal is connectable to said mobile network connectivity device with a wireless local data communication connection;

a transmitter configured to send a connection request and a network initialization signal from the terminal to the mobile network connectivity device, the network initialization signal comprising an internet protocol version 6 router solicitation;

a pre configured pre configured internet Protocol network connection at the mobile network connectivity device to the mobile network, the pre configured internet Protocol network connection comprising a wireless connection to said mobile network;

the wireless mobile network connectivity device comprising at least one processor and at least one memory comprising a computer program, the at least one processor configured when executing the computer program to open the pre configured network connection in response to the connection request, to forward said network initialization signal to the mobile network, and to receive, via the mobile network, a router advertisement from the target network and to forward the received router advertisement to the terminal.

14. The system according to claim 13, wherein said pre configured internet protocol network connection comprises an internet protocol version 6 connection.

15. The system according to claim 13, wherein said pre configured internet protocol network connection comprises an internet protocol version 4 connection.

16. The system according to claim 13, wherein said router advertisement comprises an internet protocol version 6 advertisement.

17. The system according to claim 13, said wireless mobile network connectivity device further comprising:

a time out counter configured to terminate a network link corresponding to the terminal after a pre determined inactivity timeout.

18. A mobile device, comprising:

a terminal interface comprising a first wireless receiver and a first wireless transmitter, the first receiver configured to receive a connection request over a wireless local connection with a terminal and a network initialization signal from the terminal, the network initialization signal comprising an internet protocol version 6 router solicitation;

a second wireless transmitter and a second wireless receiver configurable to have a pre configured internet protocol network connection to a network and configurable to open the pre configured network connection in response to the connection request, the pre configured internet protocol network connection comprising a wireless connection between the apparatus and a portion of the network;

the second wireless transmitter configured to send the network initialization signal including the router solicitation to the network; and the second wireless receiver configured to receive a router advertisement from the network and to forward the received router advertisement to the terminal via the first wireless transmitter.

19. The apparatus according to claim 18, wherein said pre configured internet protocol network connection comprises an internet protocol version 6 connection.

20. The apparatus according to claim 18, wherein said pre configured internet protocol network connection comprises an internet protocol version 4 connection.

21. The apparatus according to claim 18, wherein said router advertisement comprises an internet protocol version 6 advertisement.

22. A method, comprising:
receiving a network initialization signal from a terminal at a wireless mobile network connectivity device via a local connection between the terminal and the wireless mobile network connectivity device, the network initialization signal comprising an internet protocol version 6 router solicitation;
in response to receiving the network initialization signal, opening a pre configured internet protocol network connection to a network with the wireless mobile network connectivity device, the pre configured internet protocol network connection being opened via a wireless link between the mobile network connectivity device and a network access node;
sending the network initialization signal from the wireless mobile network connectivity device to the network;
receiving network connectivity information from the network at the wireless mobile network connectivity device; and
forwarding the network connectivity information from the wireless mobile network connectivity device to the terminal.

23. A method, comprising:
receiving an internet protocol version 6 router solicitation message from a terminal at a wireless mobile network connectivity device via a wireless local connection established between the terminal and the wireless mobile network connectivity device;
in response to receiving the internet protocol version 6 router solicitation message, opening a network connection to a network with the wireless mobile network connectivity device, the network connection being opened via a wireless link between the wireless mobile network connectivity device and a wireless network access node;
sending the internet protocol version 6 router solicitation message from the wireless mobile network connectivity device to the network over the network connection;
receiving an internet protocol version 6 router advertisement message from the network at the wireless mobile network connectivity device over the network connection; and
forwarding the received internet protocol version 6 router advertisement message from the wireless mobile network connectivity device to the terminal so that the terminal can become connected to the network.

24. the method of claim 23, where the mobile network connectivity device is comprised of a mobile telephone.

25. An apparatus comprising:
at least one memory comprising a computer program; and
at least one processor, wherein the at least one processor is configured when executing the computer program to cause the apparatus to perform at least the following:
receiving a connection request over a local connection with a terminal and a network initialization signal from the terminal, the network initialization signal comprising an internet protocol version 6 router solicitation;
in response to the network initialization signal, opening a pre configured internet protocol network connection to a network, the pre configured internet protocol network connection comprising a wireless connection between the wireless mobile network connectivity device and an element of the network;
sending the network initialization signal including the router solicitation to the network;
receiving a router advertisement from the network; and
forwarding the received router advertisement to the terminal.

26. The method according to claim 1, where the local connection is one of a wireless connection or a wired connection.

27. The computer-readable medium according to claim 7, where the local connection is one of a wireless connection or a wired connection.

28. The system according to claim 13, where the local data communication connection is one of a wireless connection or a wired connection.

29. The apparatus according to claim 18, where the local connection is one of a wireless connection or a wired connection.

30. The method according to claim 22, where the local connection is one of a wireless connection or a wired connection.

31. The apparatus according to claim 25, where the local connection is one of a wireless connection or a wired connection.

32. The method according to claim 1, wherein sending the network initialization signal comprises forwarding the network initialization signal from the wireless mobile network connectivity device to the network.

33. The computer-readable medium according to claim 7, wherein the computer program is further configured, when sending the network initialization signal to forward the network initialization signal from the wireless mobile network connectivity device to the network.

34. The system according to claim 18, wherein the second wireless transmitter is configured to send the network initialization signal by forwarding the network initialization signal including the router solicitation to the network.

35. The method according to claim 22, wherein sending the network initialization signal comprises forwarding the network initialization signal from the wireless mobile network connectivity device to the network.

36. The method according to claim 23, wherein sending the internet protocol version 6 solicitation message comprises forwarding the internet protocol version 6 solicitation message from the wireless mobile network connectivity device to the network over the pre configured internet protocol network connection.

37. The apparatus according to claim 25, wherein sending the network initialization signal comprises forwarding the network initialization signal including the router solicitation to the network.

* * * * *

UNITED STATES PATENT AND TRADEMARK OFFICE
CERTIFICATE OF CORRECTION

| | | |
|---|---|---|
| PATENT NO. | : 8,305,968 B2 | Page 1 of 1 |
| APPLICATION NO. | : 11/037198 | |
| DATED | : November 6, 2012 | |
| INVENTOR(S) | : Savolainen et al. | |

It is certified that error appears in the above-identified patent and that said Letters Patent is hereby corrected as shown below:

Claim 13, col. 6, line 15 delete "wireless" in front of a.

Claim 13, col. 6, line 22 delete "Protocol" and insert --protocol--.

Claim 13, col. 6, line 24 delete "Protocol" and insert --protocol--.

Claim 13, col. 6, line 33 delete "connection request" and insert --network initialization signal--.

Claim 18, col. 6, line 52 delete "A mobile device" and insert --An Apparatus--.

Claim 18, col. 6, line 53 delete "wireless" and insert in front of first.

Claim 18, col. 6, line 55 delete "wireless" and insert in front of a.

Claim 18, col. 6, line 64 delete "connection request" and insert --network initialization signal--.

Claim 23, col. 7, line 42 delete "wireless" and insert in front of a.

Claim 23, col. 7, line 47 insert --preconfigured internet protocol-- in between a and network.

Claim 23, col. 7, line 49 insert --preconfigured internet protocol-- in between the and network.

Claim 23, col. 7, line 54 insert --preconfigured internet protocol-- in between the and network.

Claim 23, col. 7, line 57 insert --preconfigured internet protocol-- in between the and network.

Signed and Sealed this
Twenty-ninth Day of January, 2013

David J. Kappos
*Director of the United States Patent and Trademark Office*